United States Patent [19]

Trostle et al.

[11] Patent Number: 4,512,606
[45] Date of Patent: Apr. 23, 1985

[54] CONVERTIBLE TOP BOOT COVER

[75] Inventors: D. Mark Trostle, Canton; Milton C. Kaltz, Allen Park; Ronald Moler, Garden City; Lendell E. Cowsert, Trenton, all of Mich.

[73] Assignee: ASC Incorporated, Southgate, Mich.

[21] Appl. No.: 489,820

[22] Filed: Apr. 29, 1983

[51] Int. Cl.³ .............................................. B60J 7/20
[52] U.S. Cl. .............................................. 296/130
[58] Field of Search ........................................ 296/136

[56] References Cited

U.S. PATENT DOCUMENTS 3,170,726  2/1965  Lystad .................................. 296/136
3,180,676  4/1965  Payne .................................. 296/136
3,332,717  7/1967  Amesbury ........................... 296/136

*Primary Examiner*—Robert R. Song
*Attorney, Agent, or Firm*—Basile, Weintraub & Hanlon

[57] ABSTRACT

A boot cover 10 for enclosing the stowage compartment 18 of convertible-type vehicle 20 when the top is retracted includes a pair of spaced apart rigid section 12, 14 and as intermediate, flexible section 16. Means 26 for removably mounting the boot cover 10 to the vehicle 18, generally, includes a spring-like member 128 or 210 which is retained by a keeper 130 or merely within the well 18. A mechanical actuator 132 may be employed to release the spring from the keeper.

4 Claims, 8 Drawing Figures

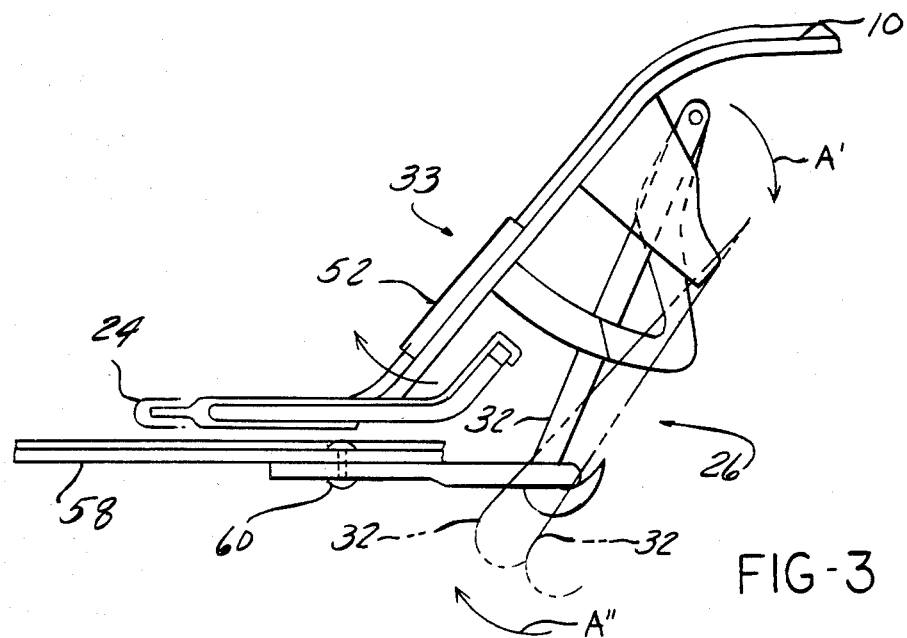
FIG-3
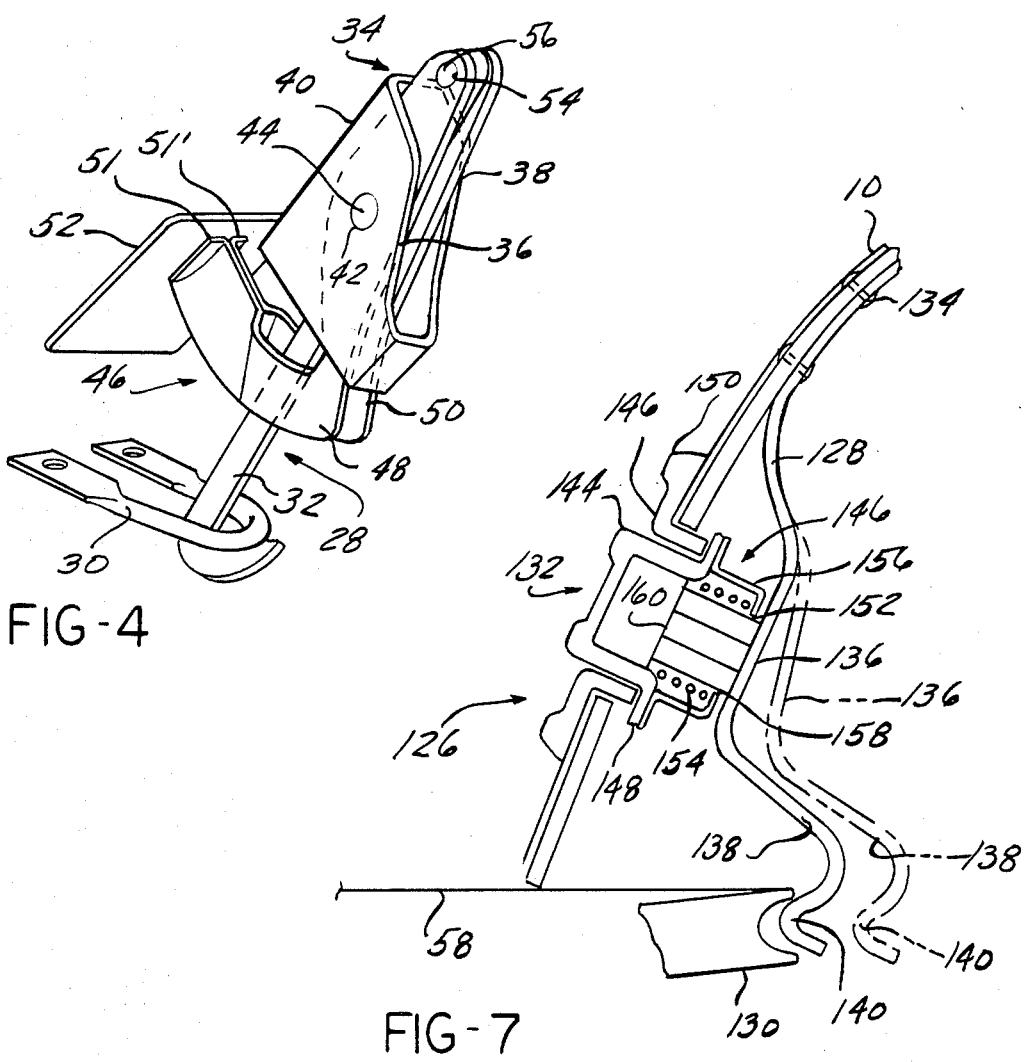
FIG-4
FIG-7

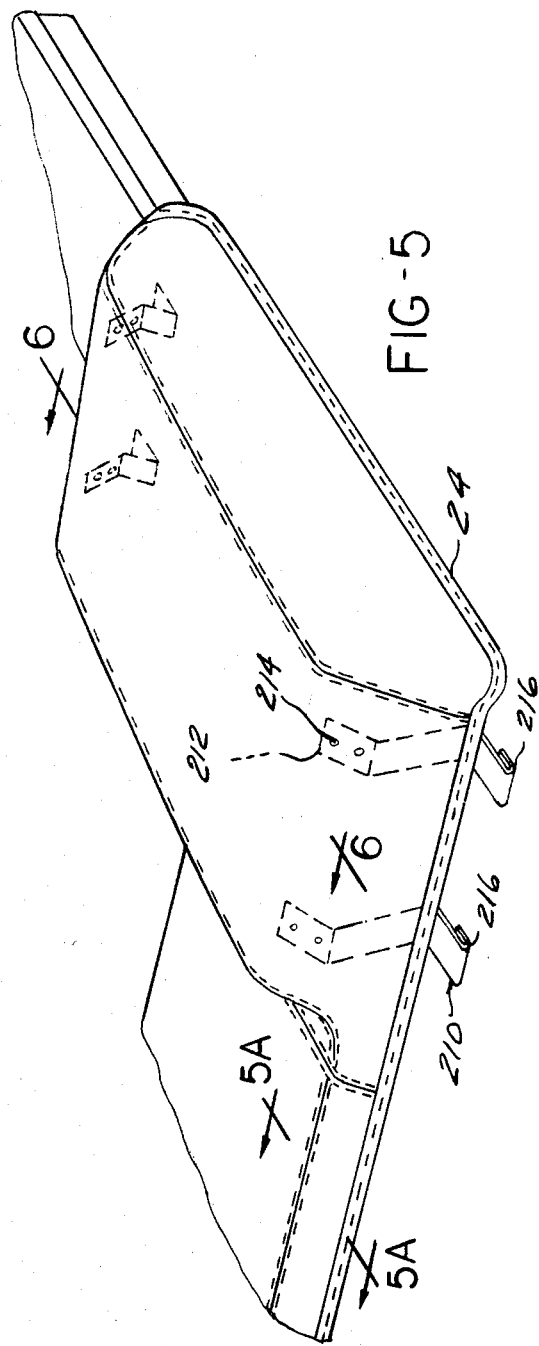
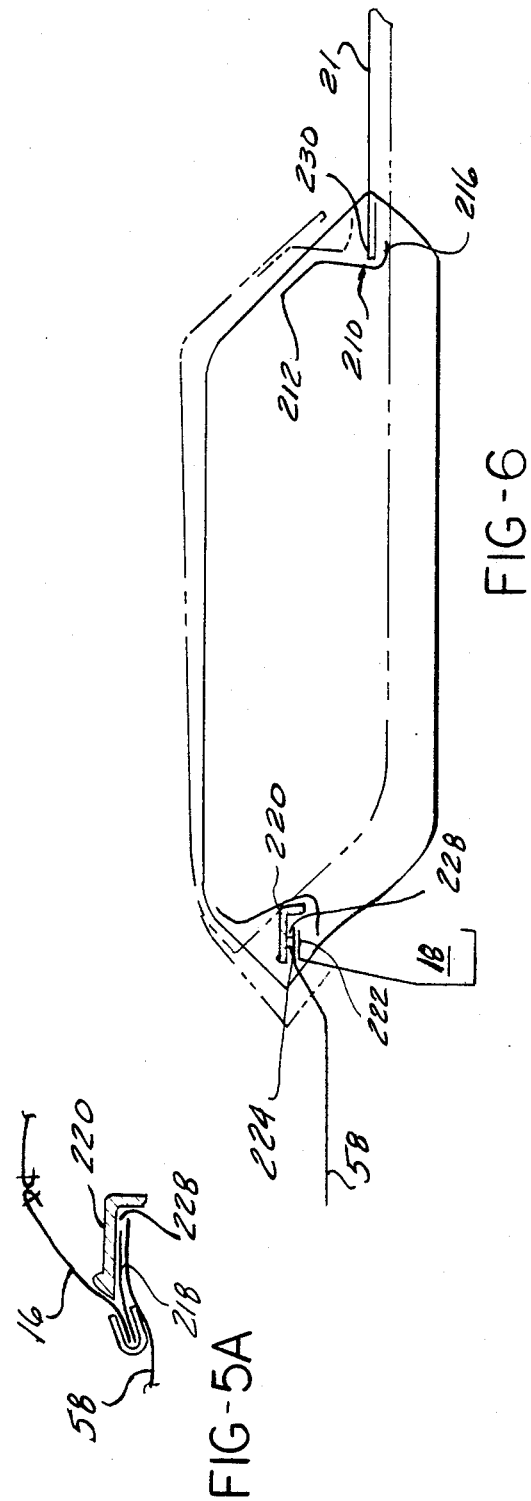

CONVERTIBLE TOP BOOT COVER

BACKGROUND OF THE INVENTION

1. Field of the Invention

The present invention concerns vehicles having convertible roof tops. More particularly, the present invention concerns convertible top boot covers which are removably mounted to a vehicle and which cover the convertible top, when in its retracted position.

2. Prior Art

Recently, the automotive market has seen a renewed interest in the "convertible" vehicle. This renewed interest has, concommitantly, regenerated and adapted prior technology to present day materials, engineering and so forth. Yet, little attention has been paid to the aesthetics of the vehicle, when the convertible top is retracted and stowed.

As is known to those skilled in the art to which the present invention pertains, a convertible-type vehicle is constructed such that there is a well or stowage compartment interposed the rear of the back seat and the trunk compartment of the vehicle. The convertible top is stowed therewithin in an accordian-type fashion. Typically, in constructing a vehicle of this type, a strip molding is disposed about the periphery of the stowage compartment. A plurality of fastener receptors are mounted onto the strip molding. A flexible piece of cloth, which has come to be known as a "boot" or "tonneau" cover is then snap-fitted into the receptors over the stowage compartment to, thus, cover the stowage or well area. These prior art covers are ordinarily flexible pieces of material. Oftentimes, these covers have excess fabric associated therewith which "flap" in the wind generating unnecessary noise and which may even scratch the paint surface of the vehicle. Furthermore, the plain fabric covering often detracts from the aesthetics of the vehicle and the general aerodynamic configurations thereof.

The present invention, as will subsequently be detailed, defines an improved stowage compartment cover or boot cover which is attractive and which will not exhibit any possibility of scratching the paint surface. Likewise, because of its construction the present boot cover eliminates the need for snap fasteners to mount the cover to the vehicle.

SUMMARY OF THE INVENTION

In accordance with the present invention there is provided a convertible top boot cover which is adapted to fit over the stowage compartment or well of a convertible-type vehicle. The boot cover hereof comprises a pair of spaced-apart rigid members and a medial flexible section interposed therebetween. The boot cover hereof is an integrally formed device, which further comprises means for removably mounting the cover to the vehicle.

The means for removably mounting the cover, generally, comprises, in a first embodiment, a latching member disposed on each of the rigid sections of the cover and a keeper or striker for the latch which is mounted on the quarter trim panel of the vehicle. Other embodiments of the means for mounting comprise spring clip assemblies, which can be rendered operative either manually or with mechanical devices.

The boot cover hereof is self-stacking in that the rigid sections can be disposed atop one another and the flexible, intermediate section can be folded and sandwiched therebetween.

For a more complete understanding of the present invention reference is made to the following detailed description and accompanying drawing. In the accompanying drawing like reference characters refer to like parts throughout the several view in which:

BRIEF DESCRIPTION OF THE DRAWING

FIG. 3 is a cross-sectional view of a first embodiment of a latching mechanism contemplated for use herein;

FIG. 4 is a perspective view of the latching mechanism of FIG. 3;

FIG. 5 is a first side elevational view of an alternate latching mechanism;

FIG. 5A is a cross-sectional view taken along the line 5A—5A of FIG. 5;

FIG. 6 is a cross-elevational view taken along line 6—6 of FIG. 5, and

FIG. 7 is a cross sectional view of a third embodiment of the latching mechanism contemplated herein.

DESCRIPTION OF THE PREFERRED EMBODIMENT

Figure 1:
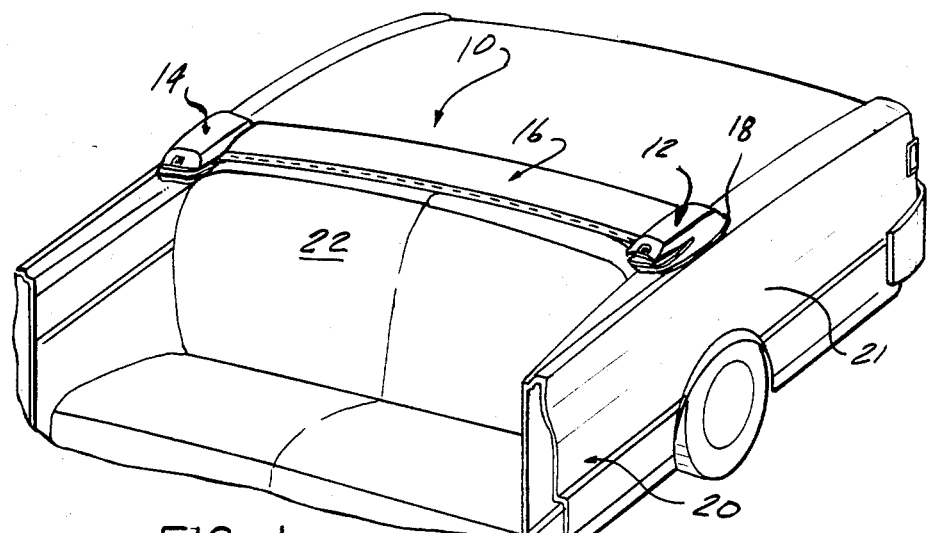
FIG. 1 is a perspective view of a boot cover in accordance with the present invention.
Figure 2:
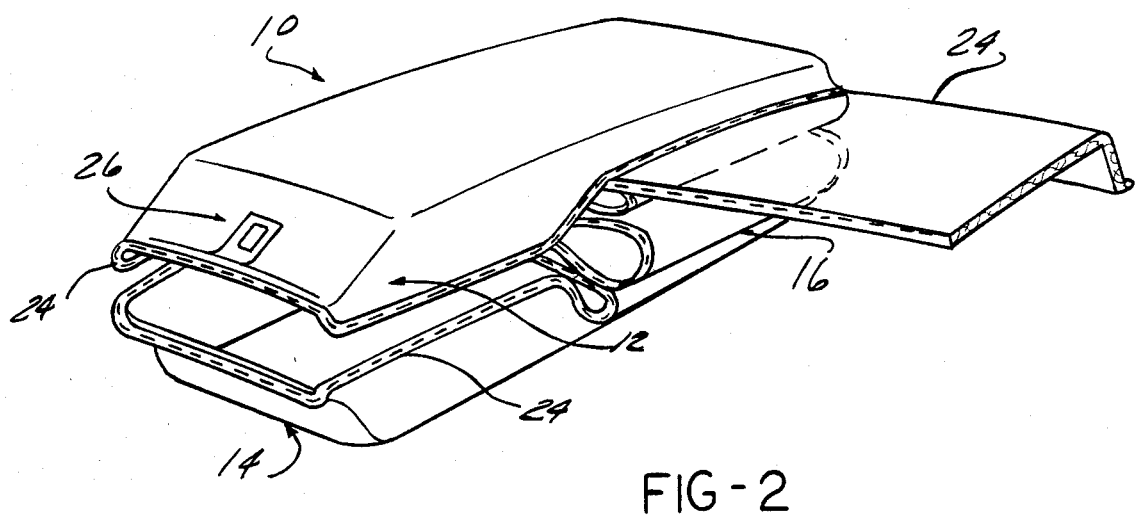
FIG. 2 is a perspective view of the boot cover hereof showing the boot cover in its stacked or stowed position.

Now, and with reference to the drawing, and, in particular, FIGS. 1 and 2 there is shown therein a boot cover in accordance with the present invention and generally denoted at 10. The boot cover 10 hereof, generally, comprises a pair of spaced-apart rigid sections or members 12, 14, respectively, and a medial or intermediate, flexible section 16. The boot cover 10 is dimensioned to overlay and cover a stowage compartment or well 18 formed in a convertible-type vehicle 20. As is known to those skilled in the art to which the present invention pertains, and as hereinabove noted, the convertible-type vehicles are provided with a stowage compartment or well 18 in which is stored the convertible top when in the retracted position. The well is, ordinarily, formed laterally and rearwardly about the periphery of the back or rear seat 22 of the vehicle 20. The rearward portion of the stowage compartment is intermediate the rear of the back seat and the trunk compartment of the vehicle.

The rigid members 12, 14 cover, substantially, the lateral portions of the well 18 proximate the quarter trim panel section 21 of the vehicle. The flexible intermediate section 16 covers the rear section or portion of the well 18. As shown in the drawing the boot cover is a substantially U-shaped member wherein the rigid sections 12, 14 define the legs of the "U" and the flexible section 16 defines the bight portion of the "U".

Although the rigid sections 12, 14 are shown in the drawing as being substantially rectangular in configuration, the present invention is not bound thereby. Rather, the rigid sections can have any desired shape, as dictated by the aesthetics, as well as the aerodynamic requirements, of the vehicle. The intermediate section is, preferably, integrally formed with the rigid sections or can be attached thereto by any suitable means such as by sewing, bonding, welding or the like.

In fabricating the boot cover hereof any suitable rigid material may be used to form the ridged sections 12, 14 such as polycarbonates, nylon, PVC-type materials, ABS resins, fiberglass and the like. Preferably, the rigid covers are molded plastic or fiberglass members. A decorative covering such as a thin vinyl sheet is secured atop the rigid members to coordinate the color thereof to the exterior paint of the vehicle.

The intermediate section can be formed from any suitable material, such as a vinyl cloth or the like. Preferably, the vinyl covering which is used to cover the rigid sections, also, defines the material for the intermediate section. Hence, in fabricating the cover hereof, a section of the vinyl cloth used to cover the rigid sections is merely extended therebetween to define the intermediate section 18.

A welt or other trim 24 is secured about the entire periphery of the boot cover for both decorative purposes as well as forming an element of a mounting assembly, as subsequently detailed.

As shown in FIG. 2 hereof the present boot cover is a self-stowing cover. The rigid members 12, 14 can be stacked one atop the other and the intermediate, flexible fabric section can then be folded in any suitable mode, such as, an accordion, pleated fold, and stowed within the interior space defined between the two rigid members, as shown.

The present invention further contemplates means for removably mounting the boot cover 26 to the vehicle 20 to cover the well 18. The means 26 comprises any suitable latching mechanism which can interconnect the boot cover to the vehicle. Optimally, there is a means 26 associated with each rigid section 12, 14. FIGS. 3–7 hereof illustrate various embodiments for effecting the removable mounting of the boot cover to the vehicle 20.

Referring first now to FIGS. 3–4 there is depicted therein a first embodiment of a means 26 for removable mounting in accordance with the present invention.

The means 26, generally, comprises a latch 28 rotatably mounted to the cover 10 and a striker 30 for retaining the latch in a locked position. The means 26 further includes means for moving the latch 52. More particularly, the means 28 includes a housing 34 mounted to the interior surface of the cover 10, as shown. The housing includes a pair of opposed side walls 36, 38, and a rear wall 40 which is secured to the cover 10 by any suitable means, such as threaded fasteners or the like (not shown). A pair of registering openings 42 (only one of which is shown) are formed in the opposed walls 36, 38. A pivot pin 44 extends through the registering openings 42. The latch 32, which comprises a substantially J-shaped member, is pivotally rotatably mounted to the housing via the pivot pin 44.

The latch 32 is moved into and out of latching engagement via the means for moving, generally, denoted at 33. The means 33 for moving the latch 32 comprises a bracket 46 which is pivotally mounted to the housing and interconnected to the latch 32. The bracket 46 comprises a pair of irregularly shaped legs 48, 50, which are spaced apart and parallel. The first end 51, 51' of each leg 48, 50, is secured to a handle 52. The handle 52 is intended to be grasped by the user for manually moving the latch into and out of latching engagement in a manner to be described subsequently. The legs 48, 50 extend laterally outwardly from the handle 52, as shown, wherefrom each leg extends upwardly and projects up through the housing 34. Each upwardly extending portion of each leg 48, 50 has a first opening formed therein (not shown). The pivot pin 44 projects through these first openings to mount the legs of the bracket 46 to the housing for pivotal rotation. It should be noted, and as shown in phantom in the drawing, the upwardly extending portion of the legs 48, 50 of the bracket 46 have an irregular configuration such that the bracket is mounted to the housing in an "over-center" manner for reasons which will become apparent hereinafter.

Referring, again, to the drawing it will be seen that the upwardly extending portion of each of the legs 48, 50 project above the upper edge of the housing 34. An opening or aperture 54 is formed in the upper section of each leg proximate the free end thereof (only one of which is shown). The openings are in registery. A pin 56 extends through the openings 54 to interconnect the upper end of each leg of the bracket.

The latch 32 is sandwiched between the legs 48 and 50, as shown. Because the latch is interconnected to the legs 48, 50, the latch will move in a manner similar to the movement of the bracket 52.

As hereinabove noted the present means for mounting includes a striker 30 which retains the latch 32 in a locking mode. The striker comprises a substantially U-shaped member which is mounted to the quarter panel 58 proximate the well 18. The striker 30 is mounted to the panel 58 by any suitable mode such as via threaded fasteners 60 or the like.

In use, when the boot cover is placed over the well, the handle 52 is grasped and moved away from the cover 10 in the direction of the arrow A. When moved in this direction, the legs of the bracket and, therefore, the latch 32 will rotate in the manner shown in the direction of the arrows A' and A", respectively. When the handle 52 is moved in the direction opposite to that of the arrows the bracket will rotate to the vertical, thereby, causing the hook to engage the bight portion of the stricker 30 as shown in solid lines. Hence, the manual movement of the handle will engage and disengage the means for mounting 26.

Referring now to FIGS. 5, 5A and 6 there is depicted therein a further embodiment of the means for mounting the boot cover 26 over the stowage or well 18. In accordance herewith each of the rigid sections has a plurality of clips 210 associated therewith. The clips 210, which are spring clips, have a first end 212 fixedly secured to the interior of the rigid section 12 or 14 associated therewith. The first end is secured to the interior of associated sections by suitable fasteners such as studs 214 or the like. The clip 210 extends below the lower surface or plane of the rigid member and projects laterally outwardly therefrom, as shown. The projecting end or portion 216 of the clip 210 is used to secure the rigid sections to the vehicle in a manner to be described subsequently.

Although the drawing discloses four similar clips associated with each rigid section, two clips being secured to the rearward position and two clips to the forward portion of each section, it is not imperative that this number of clips be used. Rather, any number which is suitable to achieve detachable mounting may be employed herein. The use of the clips for detachable mounting is described below.

The flexible or intermediate section 16 of the cover 10, as hereinbefore noted, has a welt cord or binder 24 sewn or otherwise secured about the periphery thereof. In accordance with this embodiment of the present invention, a retainer strip 218 is secured to the medial or intermediate section 16 along the length thereof via the welt 24. The retainer clip is disposed and affixed to the underneath surface of the intermediate section 16. The retainer, which is formed from a rigid plastic, such as polypropylene is secured to the intermediate section when the welt is sewn to the edge. Alternatively, the retainer can be secured to the welt via an adhesive or other suitable bonding technique.

In accordance with the present invention and as particularly shown in FIGS. 5A and 6, a trim piece or molding 220 is fixed to the sheet metal panel 58 of the vehicle 20 about the rearward edge of the well 18. Spacer studs 222 fixedly mount the trim piece 220 thereto. The spacer studs have a collar 224 which is disposed medially of the undersurface of the trim piece 220 and the sheet metal panel 58 to create a gap or space 228 therebetween.

In mounting the boot cover 10 over the well 18, in accordance with this embodiment, the rearward clips 210 are disposed within the well 18 and fitted over the trim piece 220, as shown. The clips, which are formed from a spring steel material, are then compressed rearwardly (as shown in phantom) to permit the forward clips to pass beneath the edge 230 of the interior quarter trim panel 21. When the projections 216 of the forward clips 210 are disposed beneath the quarter trim panel, the compressive force is released, and the clips are mounted within the well to hold the rigid sections in position. The intermediate section 16 is detachably mounted via the retainer strip 218. Herein, the retainer 218 is implaced within the gap 228 created between the sheet metal 226 and the trim piece 220. To remove the boot cover the retainer strip is merely removed from the gap by grasping the welt or binder and then a compressive force is applied to the clips 210 to permit the rigid sections to be moved vertically upwardly, in an apparent manner.

Referring now to FIG. 7 there is depicted therein a further embodiment of the means for removably mounting the boot cover 10 to the vehicle 20. The means for mounting, generally, denoted at 126 is mounted to the cover 10. Again, although only one mounting mechanism is shown, it is assumed that the similar means for mounting are associated with each rigid section 12, 14.

The means for mounting 126, generally, comprises a resilient locking member 128, a keeper 130 and means, generally, indicated at 132, for moving the locking member 128 into and out of the keeper 130. More particularly, the locking member 128 comprises a leaf spring or similar resilient member. The leaf spring has a first end 129 fixedly secured to the interior surface of one of the sections 12, 14 via suitable fasteners 134. The leaf spring 128 extends from the cover 10 and is bent and configured such that it has a first planar section 136 which extends past the means 132 in proximity thereto. The locking member 128 has a further section integrally formed with the section 136 which terminates in a projection 140. The projection 140 is adapted to project into and to be retained by a keeper 130 which is mounted to the quarter trim panel 58 of the vehicle 20 by any suitable mode. The keeper is configured complementary to that of the projection 140. Because of the resilient nature of the locking member 128 the projection 140 is normally urged into engagement and retention within the keeper 130.

The means 132 is actuable to disengage the projection 140 from the keeper 130. The means 132, generally, comprises a biassed assembly 142 which engages the section 136 of the locking member 128 to act thereagainst.

More particularly, the actuator assembly comprises a substantially cylindrical housing 144 disposed within an opening 146 formed in the boot cover 10. The housing 144 has a substantially U-shaped cross section, as shown. The housing 144 has an annular rim or ledge 148 extending laterally outwardly from the side wall thereof. The annulus defines a shoulder to prevent the housing 144 from being withdrawn from the opening 146. A sealing ring 150 is disposed about the periphery of the opening 146 to prevent leakage of water or the like therepast. The annulus and the sealing ring cooperate to seal the opening 146 when the means 132 is in the non-actuated position.

Disposed within the housing 144 is a plunger 152, the top wall 160 of which defines the bottom wall of the housing 144, when in the non-actuated position. The plunger is adapted to move in and out of the housing 144. The plunger 152, generally, comprises a cylindrical member having a diameter less than that of the interior of the housing 144. Biasing means such as a spring 154 envelopes the plunger 152 and biasses it toward the base or bottom of the housing 144. A retainer 156 comprising a substantially cylindrical member having a substantially U-shaped cross section mates with the housing 144, as shown, to retain the spring 154 within the housing 144 and to guide the plunger 152. The cylindrical member has an opening 158 formed in the base wall to permit exiting of the plunger from the housing.

Hence, by pushing the wall 160 against the bias of the spring 154 the plunger 152 is pushed through the opening 158 to engage the planar section 136 and, thereby, disengage the projection 140 from the keeper 130. This permits the cover 10 to be removed from its position over the well 18. The normal position of the plunger permits the projection 140 to snap fit or otherwise engage the keeper 130.

It is to be appreciated that other types of means for mounting as well as modification of the aforedescribed means may be made which are well within the abilities of the skilled artisan.

From the preceding it is apparent that there has been described herein an improved boot cover for use with automotive vehicles.

Having, thus, described the invention what is claimed is:

1. In a boot cover of the type adapted to be removably emplaced over a convertible top comprises:
   (a) a first rigid section for covering a first portion of a stowage compartment;
   (b) a second rigid section for covering a second portion of a stowage compartment;
   (c) an intermediate flexible section extending between and integral with the first and second rigid sections, the intermediate flexible section covering a further portion of a stowage compartment; and
   wherein one of the rigid sections is capable of overlying the other of the rigid sections, when not in use, to define a volume therebetween, the intermediate section being foldable and storable within the vehicle.

2. The improvement of claim 1 which further comprises:
   means for removably mounting the boot cover over a stowage compartment.

3. The improvement of claim 2 wherein the means for removably mounting comprises:
   (a) at least one spring member mounted to one of the rigid sections, (b) means for retaining the spring member disposed within a stowage compartment, and (c) means for releasing the spring member from the means for retaining.

4. The improvement of claim 1 which further comprises:

a decorative covering affixed to the rigid sections, the decorative covering extending between the rigid sections and defining the intermediate section.

* * * * *

UNITED STATES PATENT OFFICE
CERTIFICATE OF CORRECTION

Patent No. 4,512,606           Dated April 23, 1985

Inventor(s) D. Mark Trostle et al

It is certified that error appears in the above-identified patent and that said Letters Patent are hereby corrected as shown below:

In the Specification:

Column 3, line 41, after "means", delete "28" and insert --26--.

In the Claims:

Column 6, line 48, after "top", insert --stowage compartment of a vehicle, the improvement which--.

Column 6, line 52, after "compartment", insert --and--.

Signed and Sealed this

Twenty-seventh Day of October, 1987

Attest:

DONALD J. QUIGG

Attesting Officer   Commissioner of Patents and Trademarks